April 1, 1969  E. A. SALO  3,436,600
REACTANCE PROTECTION APPARATUS AND METHOD
Filed June 1, 1966
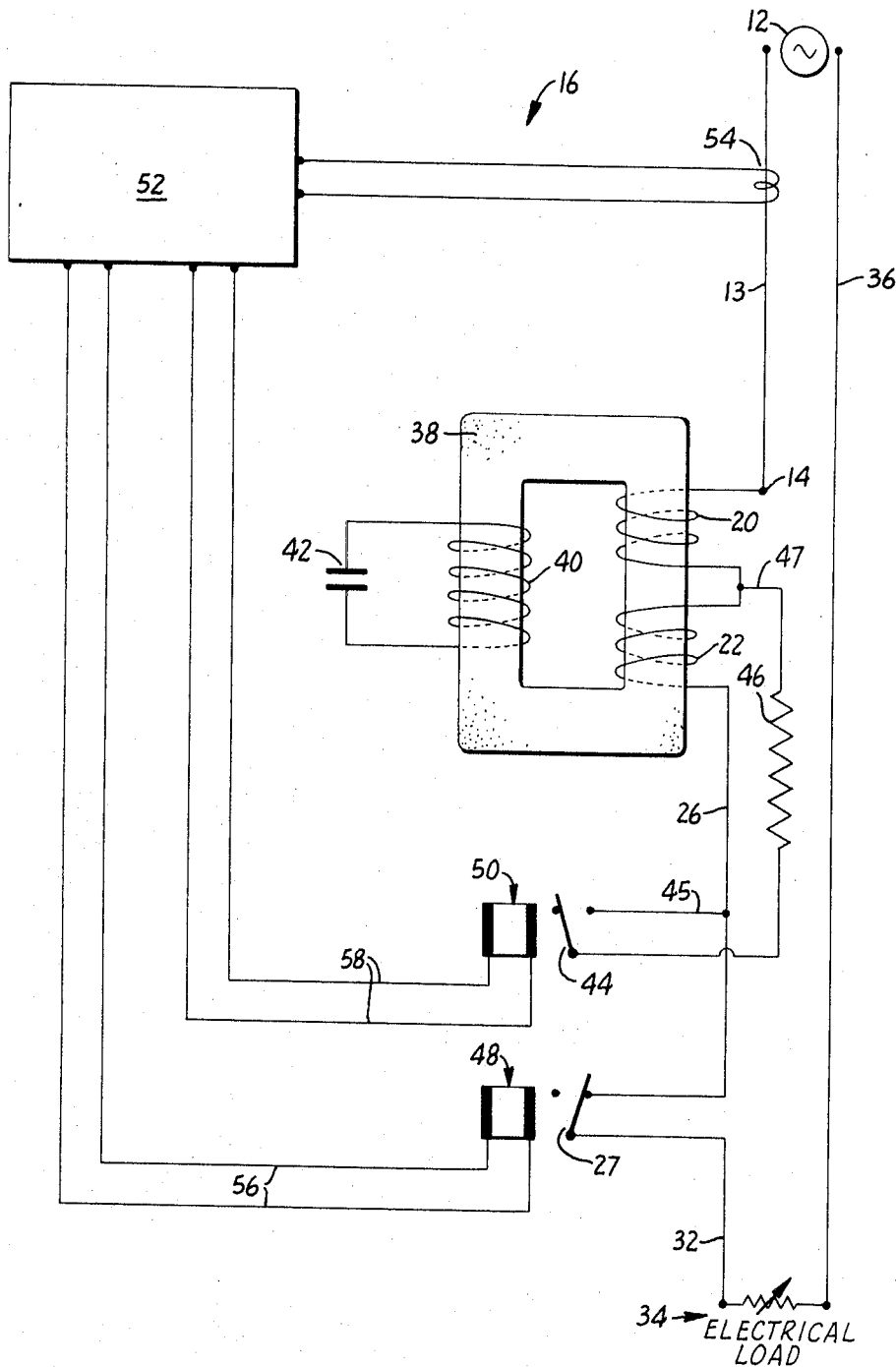
INVENTOR.
ERIC A. SALO
BY Naylor & Neal
ATTORNEYS United States Patent Office 3,436,600
Patented Apr. 1, 1969

3,436,600
REACTANCE PROTECTION APPARATUS
AND METHOD
Eric A. Salo, San Lorenzo, Calif., assignor to Eryx
Corporation, San Lorenzo, Calif., a corporation of
California
Filed June 1, 1966, Ser. No. 554,554
Int. Cl. H02h 3/28, 7/26, 9/00
U.S. Cl. 317—20                           5 Claims

ABSTRACT OF THE DISCLOSURE

A circuit overload protection system comprising a pair of inductively connected coils of equal reactance and opposite polarity adapted to be coupled into a circuit, and a selectively operable shunt to reduce the current through one of the coils upon the occurrence of an overloaded condition in the circuit. Operation of the shunt to reduce the current through one of the coils functions to increase the reactance of the protection system and, thus, decreases the load current of the circuit to which it is coupled. The system also includes a relay to disrupt the circuit in the event of a sustained overloaded condition after the reduction of the load current.

---

The present invention relates to an electrical protective scheme and apparatus arrangement. The invention is particularly designed for use in electrical transmission lines to safeguard the related electrical system from severe overloads and consequent instability.

Electrical system protection devices conventionally consist of circuit breakers that open on electrical overloads and disconnect the overload circuit from the power supply circuit. With advanced power systems, the available circuit breaker capabilities are becoming inadequate, and the simple circuit breaker action may induce transient conditions that aggravate the fault disturbance rather than correct it.

In an effort to overcome the shortcomings of conventional circuit breakers, previous inventions for reducing overload circuits have made use of increased reactance introduced by the opening of circuit breakers under load current conditions of great severity. These inventions have not, however, reduced circuit breaker capability requirements.

It is, accordingly, a principal object of the present invention to provide an electrical protection scheme and apparatus arrangement overcoming the shortcomings of the prior art.

Another and more specific object of the invention is to provide a means for solving the requirement of extraordinary current interruption capabilities which provides a load reduction period during which an electrical fault can be cleared before the faulted circuit is disconnected.

The foregoing and other objects and the details of the invention will become more apparent when viewed in light of the following description and accompanying drawing, the single figure of which schematically illustrates the invention employed in a load circuit.

Referring now specifically to the drawing, therein is illustrated a power source 12 connected by an electrical conductor 13 to a terminal 14 on the protection device of the invention. The protection device is indicated in its entirety by the numeral 16. The terminal 14 is connected to series connected windings 20 and 22, the latter of which is connected by a conductor 26 to a circuit breaker 27. The circuit breaker 27 is connected to one side of an electrical load schematically represented as 34 by a conductor 32. The other side of the electrical load 34 is connected to the power source 12 by a conductor 36.

The windings 20 and 22 are characterized in that they have opposed polarity and substantially equal electrical reactance. These windings cooperate, as can be seen from the drawing, with a common closed electromagnetic circuit provided by an electromagnetic core 38. The core 38 may be constructed of any electromagnetic material, such as iron. The core 38 also has cooperating therewith an additional winding 40 which provides a complete electrical circuit through a capacitance 42.

The apparatus of the device 16 also includes a circuit breaker 44 connected on one side to the conductor 26 by a conductor 45 and on the other side to a resistor 46. The resistor 46 is connected intermediate the windings 20 and 22 by a conductor 47. Through this arrangement, when the breaker 44 is closed, current is shunted around the winding 22 through the resistor 46 and, thus, a reactance is introduced into the load circuit. This reactance, in turn, functions to reduce the magnitude of the load current. When the electromagnetic balance between the windings 20 and 22 is disturbed, a magnetic circuit is produced in the core 38 corresponding to the net inductance of the winding 20 as reduced by the current shunted around the winding 22 by the closure of the breaker 44. This circuit threads the winding 40 and an electrical current is induced in the circuit composed of the winding 40 and series connected capacitance 42. The capacitance 42 compensates, partially, for the angular phase displacement resulting from the introduction of a net reactance by the difference of currents in the windings 20 and 22 and, in this way, prevents excessive current lag in respect to the load voltage and results in greater load circuit stability.

Actuation of the breakers 27 and 44 is provided by coils 48 and 50, respectively, which function in response to electrical impulses received from a relay 52. The relay 52 may be of the inverse time relay action type and may be actuated by a line current transformer 54 operatively connected to the conductor 13. Electrical conductors 56 and 58 transmit the electrical impulses to the coils 48 and 50, respectively.

Operation

Under normal load conditions, the device 16 operates with the breaker 44 open and the breaker 27 closed. With the breakers so positioned, load current flows through the windings 20 and 22 to supply the load requirements at 34 and the electrical reactance of the device is essentially zero. The latter condition results because the inductive effects of the windings 20 and 22 are of the same magnitude and of opposed polarities. Under these normal conditions, the magnetic flux through the core 38 is also substantially zero because the opposed and balanced windings 20 and 22 eliminate any exciting flux. For this reason, there is no applicable current in the circuit composed of the winding 40 and series capacitance 42.

In the event the load 34 becomes excessive, the relay 52 senses the overload by the current from the transformer 54 and operates, through inverse time relay action, to energize the coil 50 and close the breaker 44. As noted above, closing of the breaker 44 shunts current around the winding 22, thus reducing the current therein below that in the winding 20 and destroying the balance of reactive impedance between the windings 20 and 22. This effects the insertion of the reactance effect difference into the load circuit and reduces the load current correspondingly. When the opposed field from the winding 22 is reduced by the current reduction therein through the shunt action of the resistor 46 caused by closing of the breaker 44, a current is simultaneously established in the winding 40 by the magnetic flux generated by the winding 20. With current thus established in the winding 40, the capacitance 42 becomes a compensating series capacitance and serves to stabilize the current-voltage phase angle and, in this way, reduces electrical instability of the system.

If the current sensed by the transformer 54 continues above the normal load beyond the time setting of the relay 52, the relay functions to energize the coil 48, thus opening the circuit breaker 27 and causing an open circuit which relieves the system of the load 34. It is noted that opening of the breaker 27 is effected under the reduced load current induced by the aforedescribed operation which takes effect upon shunting of the winding 22.

If the overload is corrected resultant to closing of the breaker 44, this breaker is quickly reopened by action of the coil 50 responsive to an impulse from the relay 52. This restores the electrical circuit of the inventive device to normal without loss of the load 34 and the instability transients common with conventional circuit breakers which open immediately on overload.

It is here noted that the resistor 46 is provided in the shunt conductor connected between the breaker 44 and conductor 47 to reduce circulating currents in the winding 22 upon closing of the breaker 44. Although it is possible to omit the resistor 46 and provide a straight shorting conductor between the breaker 44 and conductor 47, it is likely that this arrangement would result in excessive circulating currents in the winding 22 upon closing of the breaker 44.

Attention is here also directed to the fact that the capacitance 42 serves as a series capacitor and is of great usefulness in long transmission lines. Under circumstances where this capacitance is not required, as may be the case on certain networks, it can of course be made small or omitted.

From the foregoing description and accompanying drawing, it is believed apparent that the present invention enables the accomplishment of the objects initially set forth herein. Attention is especially invited to the provision by the invention of an arrangement wherein the load current to the circuit breaker effecting total interruption is decreased prior to breaker activation. Through this arrangement, the capability requirements of the breaker are greatly decreased.

It is to be understood that the invention is not intended to be limited to the specific embodiment illustrated and described, but rather is defined by the following claims.

What is claimed is:
1. An electrical current protection device comprising:
  (a) a first winding coil adapted to be connected to a source of current;
  (b) a second winding coil arranged so that substantially all flux threading the first winding coil also threads the second winding coil and substantially all the flux threading the second winding coil also threads the first winding coil;
  (c) connection means electrically interconnecting the first winding coil to the second winding coil in series to provide a minimum reactance under normal current conditions;
  (d) a shunt means adapted to disrupt the connection means to establish an increased reactance responsive to drawing of excess current from a source of current connected to the first winding coil;
  (e) first line means adapted to be connected between the second winding coil and a current outlet; and,
  (f) second line means adapted to be connected between the shunt means and a current outlet.

2. An electrical current protection device as described in claim 1, further characterized by:
  (a) a first switch means in the first line means having a normally closed position, and adapted to open to interrupt the current if an increase in current has not been reduced to an acceptable level within a predetermined period of time; and,
  (b) a second switch means in the second line having a normally open position, and adapted to close when the current initially exceeds the normal current to effect disruption by the shunt means.

3. An electrical current protection device as described in claim 1, further characterized by a resistor within the shunt means.

4. An electrical current protection device comprising:
  (a) a closed electromagnetic circuit;
  (b) a first winding coil electromagnetically connected to the closed electromagnetic circuit and adapted to be connected to a source of current;
  (c) a second winding coil arranged so that substantially all flux threading in the first winding coil also threads the second winding coil and substantially all the flux threading the second winding coil also threads the first winding coil;
  (d) connection means electrically interconnecting the first winding coil to the second winding coil in series to provide a minimum reactance under normal current conditions;
  (e) a shunt means adapted to disrupt the connection means to establish an increased reactance responsive to the drawing of excess current from a source of current connected to the first winding;
  (f) a series capacitance electromagnetically connected to the closed electromagnetic circuit;
  (g) first line means adapted to be connected between the second winding coil and a current outlet; and,
  (h) second line means adapted to be connected between the shunt means and a current outlet.

5. An electrical current protection device as described by claim 4, further characterized by a resistor within the shunt means.

References Cited
UNITED STATES PATENTS
1,477,668   12/1923   Schroter _____ 317—58 X JOHN F. COUCH, *Primary Examiner.*

J. D. TRAMMELL, *Assistant Examiner.*

U.S. Cl. X.R.

317—27; 323—6, 9, 88